Patented Dec. 10, 1935

2,023,473

UNITED STATES PATENT OFFICE 2,023,473

HYDROABIETOYL CHLORIDE AND PROCESS OF PREPARING THE SAME

Clyde O. Henke, South Milwaukee, and Milton A. Prahl, Milwaukee, Wis., assignors to E. I. du Pont de Nemours & Company, Wilmington, Del., a corporation of Delaware No Drawing. Application December 21, 1932, Serial No. 648,241

8 Claims. (Cl. 260—123)

This invention relates to novel organic compounds and to a process of preparing the same. More particularly, this invention deals with the hitherto unknown acyl-chloride derived from hydrogenated abietic acid by replacing the OH group of the carbonyl radical by a chlorine atom and processes for making the same.

We have found that hydrogenated abietic acid can be readily converted into its corresponding acyl chloride by the methods generally used for converting carboxylic acid compounds into the corresponding acyl chlorides. These methods are well recognized in the art and generally involve reacting upon the organic carboxylic acid or a salt thereof with an inorganic acid chloride, such as phosphorus pentachloride, phosphorus oxychloride, phosphorus trichloride, thionyl chloride, phosgene, and the like. The effect is rather surprising, because non-hydrogenated abietic acid does not undergo conversion into the corresponding acyl chloride when treated, for instance, with thionyl chloride.

Our invention is applicable either to pure hydro-abietic acid or to hydrogenated rosin, either wood or gum. A particularly good product is obtained by the use of hydrogenated wood rosin which has been vacuum distilled according to co-pending application of Henke, Ser. No. 486,748.

Our novel product constitutes a very valuable intermediate for the manufacture of various other organic compounds, particularly esters of hydrogenated abietic acid. At room temperature it is a pale yellow to dark-brown viscous liquid, soluble in most organic solvents, such as benzene, toluene, or carbon tetrachloride. It is insoluble in cold water, but hydrolyzes therein slowly, more rapidly in hot water, to give hydrogenated abietic acid as a white precipitate. When allowed to stand in open air it absorbs moisture on the surface and forms a hard crust of hydrogenated abietic acid. It reacts with alcohols to give esters of hydroabietic acid and hydrochloric acid gas. Its chemical constitution most probably corresponds to the formula Ab—COCl, where Ab represents the nuclear structure of hydrogenated abietic acid, and stands for the group $C_{19}H_{31}$ or $C_{19}H_{33}$ depending on whether dihydro- or tetrahydroabietic acid is used as initial material. In view of its derivation, and in correspondence with similar organic compounds, we shall name the product hereinafter hydroabietoyl chloride.

Without limiting our invention to any particular procedure, the following examples are given to illustrate our preferred mode of operation. Parts given are by weight.

Example 1

69 parts of phosphorus trichloride and 342 parts of carbon tetrachloride are placed in a suitable container, and chlorine gas is passed through the mixture until it is no longer being absorbed. Into this mixture, which now contains phosphorus pentachloride, a solution of 152 parts of hydrogenated rosin (iodine number=10 to 20) in 90 parts of benzene is stirred in. The mixture is now heated to distill off the solvents, and a current of benzene vapors is swept through the molten residue to vaporize and distill over the phosphorus oxychloride formed in the reaction. The temperature is finally raised to 110° C. and maintained thus for 10 to 15 minutes, while continuing the through current of benzene vapors. Carbon dioxide or another inert gas is then swept through the mixture at the same temperature until the weight of the product corresponds to 160–163 parts. The mass is now cooled, and constitutes hydroabietoyl-chloride of high purity and excellent yield. Its chlorine content is about 10 to 11%, and its chemical constitution very probably corresponds to $C_{19}H_{33}$—COCl.

Example 2

375 parts of thionyl chloride and 300 parts of benzene are mixed and added slowly to a solution of 760 parts of hydrogenated rosin (iodine number=10 to 20) in 760 parts of benzene at a temperature of about 50 to 70° C. The mixture is then refluxed for 2 to 3 hours, after which the benzene and excess thionyl chloride are distilled off, and the temperature allowed to rise to 110° C. A vacuum (about 28 inches) is then applied, and the distillation continued at 110° C. until the weight of the residual mass corresponds to 810–815 parts. The mass is then cooled and constitutes a high grade of hydroabietoyl chloride.

Example 3

The procedure is the same as in Example 1, except that in lieu of 152 parts of hydrogenated rosin of iodine number 10 to 20, here an equal weight of hydrogenated rosin of iodine number 80 is used. The product resembles that obtained in Example 1, both in physical properties and chemical behavior. Its constitution most probably corresponds to the formula $C_{19}H_{31}$·COCl.

It will be understood that many variations and modifications are possible in our preferred procedure above set forth without departing from the spirit of this invention. For instance, in Example 1, the preparation of the phosphorus pentachloride may be proceeded with according to the new process of Walter V. Wirth described in U. S. Patent No. 1,906,440. The recovering of the final product is then also modified as indicated in said copending application. Also, other methods known in the art for converting a carboxylic acid compound into its corresponding acyl chloride may be used. Instead of hydrogenated rosin, pure tetrahydro-abietic acid, dihydroabietic acid, or mixtures of the two may be used. Other variations and modifications will be readily apparent to persons skilled in the art.

We claim:

1. An hydroabietoyl chloride.
2. A compound of the general formula Ab—COCl, where Ab stands for the group $C_{19}H_{31}$ or $C_{19}H_{33}$ representing the nuclear structure of hydrogenated abietic acid.
3. Tetrahydroabietoyl chloride.
4. Dihydroabietoyl chloride.
5. An acid chloride corresponding to the compound obtainable by reacting upon hydrogenated rosin with an inorganic acid chloride.
6. The process of producing an acyl chloride derivative of hydrogenated abietic acid which comprises reacting upon a substance containing hydrogenated abietic acid with an inorganic acid chloride.
7. The process which comprises reacting upon hydrogenated rosin with phosphorus pentachloride and recovering the reaction product.
8. The process which comprises reacting upon hydrogenated rosin with thionyl chloride and recovering the reaction product.

CLYDE O. HENKE.
MILTON A. PRAHL.